US010868868B2

(12) United States Patent
Misumi et al.

(10) Patent No.: US 10,868,868 B2
(45) Date of Patent: Dec. 15, 2020

(54) SENSING DATA DISTRIBUTION SYSTEM, AND DEVICE AND PROGRAM THEREFOR

(71) Applicant: OMRON Corporation, Kyoto (JP)

(72) Inventors: Shuichi Misumi, Kyoto (JP); Tetsuji Yamato, Yokohama (JP); Sangryul Lee, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 16/464,055

(22) PCT Filed: Oct. 25, 2017

(86) PCT No.: PCT/JP2017/038549
§ 371 (c)(1),
(2) Date: May 24, 2019

(87) PCT Pub. No.: WO2018/110101
PCT Pub. Date: Jun. 21, 2018

(65) Prior Publication Data
US 2019/0387059 A1   Dec. 19, 2019

(30) Foreign Application Priority Data
Dec. 15, 2016   (JP) .................................. 2016-243089

(51) Int. Cl.
*H04L 29/08*   (2006.01)
*G06F 9/54*   (2006.01)
*G06K 9/62*   (2006.01)

(52) U.S. Cl.
CPC .............. *H04L 67/12* (2013.01); *G06F 9/542* (2013.01); *G06K 9/6215* (2013.01); *H04L 67/10* (2013.01)

(58) Field of Classification Search
CPC .......... H04L 67/12; H04L 67/10; G06F 9/542
See application file for complete search history.

(56) References Cited

U.S. PATENT DOCUMENTS 9,380,402 B2 *   6/2016   An ......................... H04W 40/02
2014/0172132 A1   6/2014   Ura
(Continued)

FOREIGN PATENT DOCUMENTS

EP   2801962 A1   11/2014
EP   2940601 A1   11/2015
(Continued)

OTHER PUBLICATIONS

Kodai Sato, "Financial Innovation and Control", Nomura Capital Market Quarterly Review, Autumn 2016, Nov. 1, 2016, pp. 75 to 90, vol. 20, No. 2, ISSN 2185-4629, Nomura Institute of Capital Markets Research Co., Ltd., Relevance is indicated in the (translated) ISR/WO dated Jan. 30, 2018.
(Continued)

*Primary Examiner* — Viet D Vu
(74) *Attorney, Agent, or Firm* — Metrolex IP Law Group, PLLC

(57) ABSTRACT

This invention further enhances the possibility of sensing data being distributed in the case where matching of metadata determines that conditions do not coincide. A data intermediary server 3 performs matching of provider-side metadata transmitted from a sensor management apparatus and user-side metadata transmitted from a data user-side server 2 on an item-by-item basis, calculates scores according to the degree of matching therebetween, and, in the case where the total value of the scores (similarity) does not meet a predetermined first threshold but is greater than or equal to a second threshold, generates provider-side metadata to which the total value of the scores and information on unmatched items of the user-side metadata are appended, and notifies this provider-side metadata to the sensor management apparatus as notification information.

14 Claims, 9 Drawing Sheets

(56) References Cited

U.S. PATENT DOCUMENTS

| 2014/0372561 | A1 | 12/2014 | Hisano |
| 2015/0142848 | A1 | 5/2015 | Kawamura et al. |
| 2016/0210862 | A1 | 7/2016 | Hisano |
| 2016/0299902 | A1 | 10/2016 | Uenoyama et al. |
| 2016/0330534 | A1* | 11/2016 | White, Jr. ................ H04Q 9/00 |

FOREIGN PATENT DOCUMENTS

| JP | 2010-205107 A | 9/2010 |
| JP | 2011-198277 A | 10/2011 |
| JP | 5445722 B1 | 3/2014 |

OTHER PUBLICATIONS

English translation of the International Search Report of PCT/JP2017/038549 dated Jan. 30, 2018.
Written Opinion of PCT/JP2017/038549 dated Jan. 30, 2018.
Extended European search report dated Nov. 27, 2019 in a counterpart European patent application.

* cited by examiner

Fig. 6

| | | | |
|---|---|---|---|
| · Data provider | 10 pts(100%:10 pts) | → | Reason for grade: Perfect match |
| · Measurement target | 10 pts(100%:10 pts) | → | Reason for grade: Perfect match |
| · Measurement target attribute | 10 pts(100%:20 pts) | → | Reason for grade: Due to close match |
| · Location | 10 pts(100%:10 pts) | → | Reason for grade: Perfect match |
| · Sensor type | 10 pts(100%:10 pts) | → | Reason for grade: Perfect match |
| · Measurement data-time | 10 pts(100%:10 pts) | → | Reason for grade: Perfect match |
| · Price | 20 pts(100%:20 pts) | → | Reason for grade: Perfect match |
| · Data use application range | 20 pts(100%:20 pts) | → | Reason for grade: Perfect match |

| | |
|---|---|
| Data provider | : Company 002 |
| Measurement target | : Body |
| Measurement target attribute | : Blood pressure |
| Location | : Home |
| Sensor type | : Blood pressure monitor (wrist type) |
| Measurement data-time | : 2016-12-22-12-00-00 |
| Price | : ≥ 80 yen |
| Data use application range | : Secondary use planned |

Fig. 8

Matching result

Logged in: Individual 001

Score (out of 110)

MR1:
- Data provider : Individual 001
- Measurement target : Body
- Measurement target attribute : Max. blood pressure (user side: blood pressure)
- Location : Home
- Sensor type : Blood pressure monitor (wrist type)
- Measurement data-time : 2016-12-22-12-00-00
- Price : ≥ 100 yen
- Data use application range : Secondary use NG

100

MR2:
- Data provider : Individual 001
- Measurement target : Body
- Measurement target attribute : Max. blood pressure (user side: blood pressure)
- Location : Home
- Sensor type : Blood pressure monitor (wrist type)
- Measurement data-time : 2016-12-22-12-00-00
- Price : ≥ 100 yen
  (user side: ≤ 80 yen)
- Data use application range : Secondary use NG
  (user side: Secondary use planned)

60

Back

SENSING DATA DISTRIBUTION SYSTEM, AND DEVICE AND PROGRAM THEREFOR

TECHNICAL FIELD

This invention relates to a sensing data distribution system and to an apparatus and a computer program that are used in this system.

BACKGROUND ART

A technology called a sensor network is currently being investigated. This technology enables collection, management and seamless usage of sensing data, by installing sensor devices (also simply called "sensors") having a sensing function and a communication function in various locations or industrial facilities and networking these sensors. In recent years, combining information relating to numerous things that exist in the world using IoT (Internet of Things) on a network and thereby realizing new services has been variously investigated. Sensor networks will be an important element technology in realizing this. However, the current reality is that generally sensor networks are used only for the purpose of the owner of the sensor utilizing the sensing data according to their own use application, and the sensing data is not utilized for other use applications.

In view of this, the applicant proposes a system that enables a third party to utilize sensing data obtained by a sensor network by distributing the sensing data via a server provided with an intermediary role, and thereby expands the use applications of the sensing data. In this system, the data provider side and the data user side respectively transmit metadata containing attribute information that includes provision conditions and use conditions of sensing data, for example. A server then matches the metadata and, if the conditions coincide, sensing data is transferred from the data provider side to the data user side (e.g., see JP 5445722).

It is hoped that, when the system described in JP 5445722 is practically implemented, effective usage of sensing data will be promoted and new value will be produced in various service fields including social infrastructure. On the other hand, in the system described in JP 5445722, the case where the result of metadata matching indicates that conditions do not coincide has still not been adequately investigated.

CITATION LIST

Patent Literature

Patent Literature 1: JP 5445722

SUMMARY OF INVENTION

Technical Problem

This invention, in view of the above circumstances, in one aspect provides a sensing data distribution system that further enhances the possibility of sensing data being distributed in the case where matching of metadata determines that conditions do not coincide, and an apparatus and computer program thereof.

Solution to Problem

In order to solve the above problems, a first mode of this invention relates to a sensing data distribution system provided with a sensor management apparatus configured to manage sensing data output from a sensor, a user-side apparatus configured to be used by a user of the sensing data, and a data intermediary apparatus configured to perform communication between the sensor management apparatus and the user-side apparatus via a network. The data intermediary apparatus includes a first acquisition unit, a second acquisition unit, a similarity evaluation unit, and a notification information transmission unit. The first acquisition unit is configured to acquire, from the sensor management apparatus, first metadata including attribute information of sensing data that is to be provided. The second acquisition unit is configured to acquire, from the user-side apparatus, second metadata including attribute information of sensing data that is desired for use. The similarity evaluation unit is configured to calculate a similarity between the first metadata acquired by the first acquisition unit and the second metadata acquired by the second acquisition unit by performing matching of the first and second metadata, and evaluate the similarity. The notification information transmission unit is configured to transmit notification information including the similarity to the sensor management apparatus, in a case where an evaluation result of the similarity evaluation unit does not meet a predetermined condition. On the other hand, the sensor management apparatus includes a notification information reception unit. The notification information reception unit is configured to receive the notification information transmitted from the data intermediary apparatus.

A second mode of this invention relates to a data intermediary apparatus configured to perform communication, via a network, between a sensor management apparatus that manages sensing data output from a sensor and a user-side apparatus that is used by a user of sensing data. The data intermediary apparatus is provided with a first acquisition unit, a second acquisition unit, a similarity evaluation unit, and a first notification information transmission unit. The first acquisition unit is configured to acquire, from the sensor management apparatus, first metadata including attribute information of sensing data that is to be provided. The second acquisition unit is configured to acquire, from the user-side apparatus, second metadata including attribute information of sensing data that is desired for use. The similarity evaluation unit is configured to calculate a similarity between the first metadata acquired by the first acquisition unit and the second metadata acquired by the second acquisition unit by performing matching of the first and second metadata, and evaluate the similarity. The first notification information transmission unit is configured to transmit first transmit notification information including the similarity to the sensor management apparatus, in a case where an evaluation result of the similarity evaluation unit does not meet a predetermined condition.

In a third mode of this invention, the data intermediary apparatus is further provided with an instruction information transmission unit configured to transmit instruction information for causing the sensor management apparatus to transfer the sensing data to the user-side apparatus, in a case where the evaluation result of the similarity evaluation unit meets the predetermined condition.

In a fourth mode of this invention, the similarity evaluation unit includes a score calculation unit and an evaluation unit. The score calculation unit is configured to, in a case where the first and second metadata each have the same plurality of items, calculate scores representing a degree of similarity between the metadata on an item-by-item basis, and take a total value of the scores as the similarity. The evaluation unit is configured to evaluate the similarity, by comparing the similarity calculated by the score calculation unit with a threshold set as the predetermined condition.

In a fifth mode of this invention, the score calculation unit sets weight coefficients of the scores in advance on an item-by-item basis, and calculates the scores representing the degree of similarity between the metadata on an item-by-item basis, with consideration for the weight coefficients.

In a sixth mode of this invention, the first notification information transmission unit includes an extraction unit, a generation unit, and a transmission unit. The extraction unit is configured to extract an unmatched item on a basis of the scores calculated on an item-by-item basis. The generation unit is configured to generate item-by-item notification information including the extracted unmatched item and the score calculated for the extracted unmatched item. The transmission unit is configured to transmit the generated item-by-item notification information to the sensor management apparatus as the first notification information.

In a seventh mode of this invention, the data intermediary apparatus is further provided with a second notification information transmission unit. The second notification information transmission unit is configured to, in a case where the evaluation result of the similarity evaluation unit does not meet the predetermined condition, transmit second notification information representing the evaluation result to the user-side apparatus.

An eighth mode of this invention relates to a sensor data intermediary method that is executed by a data intermediary apparatus configured to perform communication, via a network, between a sensor management apparatus that manages sensing data output from a sensor and a user-side apparatus that is used by a user of sensing data. The sensor data intermediary method is provided with a process of acquiring, from the sensor management apparatus, first metadata including attribute information of sensing data that is to be provided, a process of acquiring, from the user-side apparatus, second metadata including attribute information of sensing data that is desired for use, a process of calculating a similarity between the acquired first metadata and the acquired second metadata by performing matching of the first and second metadata, and evaluating the similarity, and a process of transmitting notification information including the similarity to the sensor management apparatus, in a case where an evaluation result obtained in the process of evaluating the similarity does not meet a predetermined condition.

According to the first, second and eighth modes of this invention, in the case where the result of evaluating the similarity between the metadata does not meet a predetermined condition, as a result of performing processing for matching first metadata transmitted from a sensor management apparatus and second metadata transmitted from a user-side apparatus in a data intermediary apparatus, notification information including the similarity is transmitted to the sensor management apparatus. Thus, it becomes possible for the sensor management apparatus to retransmit the first metadata after adjusting the contents thereof according to the notification information, thereby enhancing the probability that the result of evaluating the similarity between the metadata will satisfy the predetermined condition. Accordingly, it becomes possible to further facilitate distribution of sensing data. Also, the existence of sensors with respect to which matching is not established can be reduced, thereby enabling the processing load and the communication amount of the data intermediary apparatus to be reduced.

According to the third mode of this invention, in the case where the similarity evaluation result meets the predetermined condition, instruction information for transmitting sensing data is transmitted from the data intermediary apparatus to the sensor management apparatus. Thus, in the case where the evaluation result meets the predetermined condition, as a result of performing processing for matching the first metadata and the second metadata, the sensing data is directly transmitted from the sensor management apparatus to the user-side apparatus.

According to the fourth mode of this invention, scores representing the degree of similarity between the metadata are calculated on an item-by-item basis, and the similarity between the metadata is evaluated on the basis of the total value of the scores. Thus, in the case where the metadata has a plurality of items, evaluation that takes the degree of similarity into consideration for all of the items becomes possible.

According to the fifth mode of this invention, weight coefficients of the scores are set in advance for each of the plurality of items of the metadata, and the scores representing the degree of similarity between the metadata are calculated on an item-by-item basis with consideration for the weight coefficients. Thus, the importance for every item can be reflected when evaluating the similarity between metadata, for example, enabling more precise evaluation to be performed.

According to the sixth mode of this invention, when transmitting the first notification information to the sensor management apparatus from the data intermediary apparatus, information including items that the result of metadata matching indicates are unmatched and the score calculated for those items is transmitted. Thus, the sensor management apparatus, when adjusting the first metadata, is able to clearly grasp the items whose contents are to be adjusted.

According to the seventh mode of this invention, the data intermediary apparatus, in the case where the result of evaluating the degree of similarity between the metadata does not meet the predetermined condition, transmits second notification information representing the evaluation result to the user-side apparatus. Thus, the user-side apparatus is able to recognize that the sensing data that is desired for use is not available.

The second notification information representing the evaluation result desirably includes item-by-item evaluation results. By adopting this configuration, the user-side apparatus is able to know the evaluation results on an item-by-item basis, thereby enabling the use conditions for sensing data that is desired for use to be adjusted on an item-by-item basis.

Advantageous Effects of Invention

That is, according to the modes of this invention, a sensing data distribution system that is able to further enhance the possibility of sensing data being distributed in the case where matching of metadata determines that conditions do not coincide and an apparatus and computer program thereof can be provided.

BRIEF DESCRIPTION OF DRAWINGS

FIG. 6 is a diagram showing an example of calculation of a matching score between the metadata shown in FIG. 5.

FIG. 7 is a diagram showing another example of user-side metadata transmitted from the data user-side server.

FIG. 8 is a diagram showing exemplary display of matching results transmitted to the sensor management apparatus.

DESCRIPTION OF EMBODIMENTS

Figure 1:
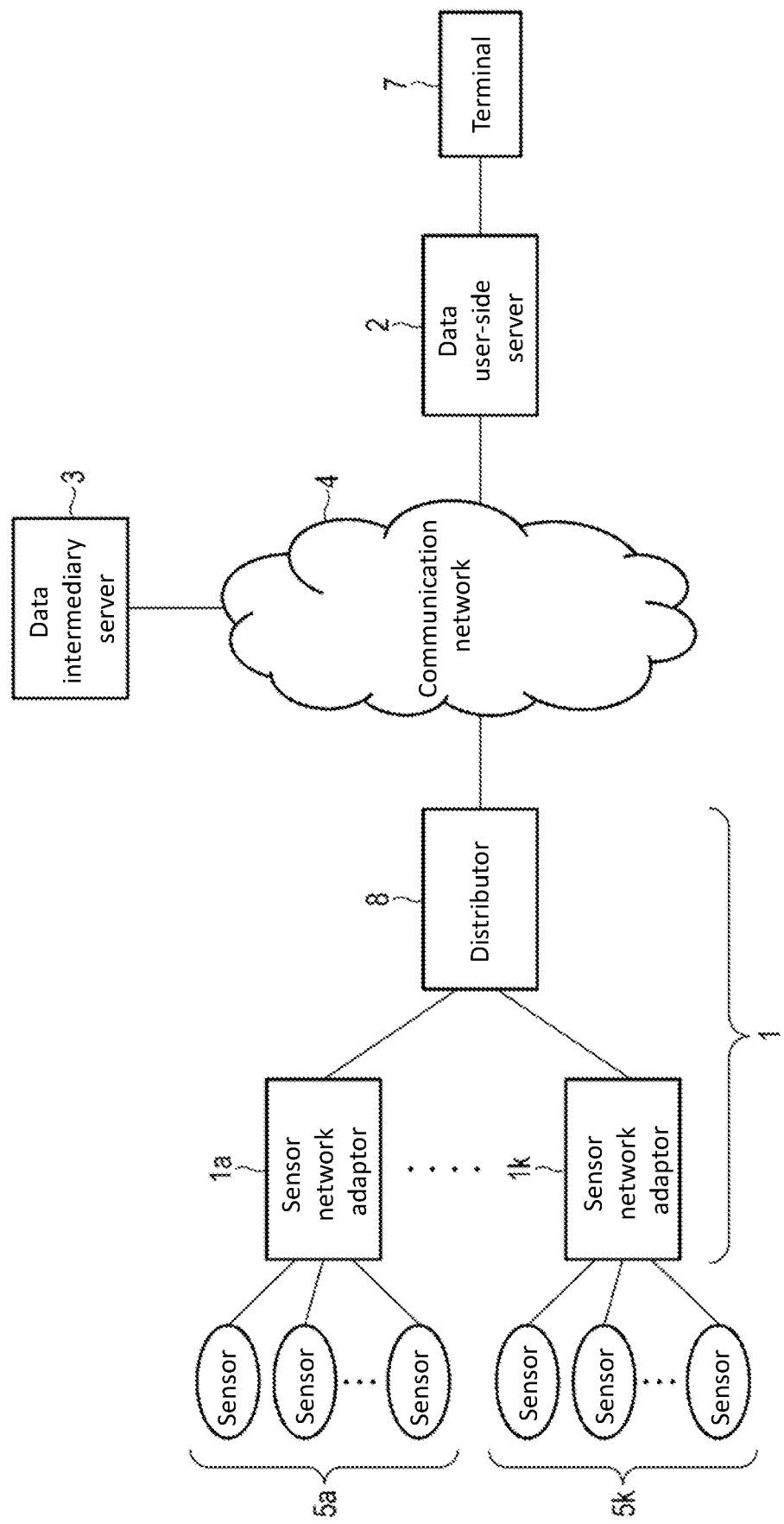
FIG. 1 is a diagram showing the overall configuration of a sensing data distribution system according to a first embodiment of this invention.

Hereinafter, the drawing will be used in describing forms of implementation (hereafter also described as embodiments) according to an aspect of this invention with reference to the drawings.

The embodiments that will be described below are, however, in all respects merely illustrative of the present invention. Needless to say, various improvements and modifications can be made without departing from the scope of the invention. In other words, in implementing the present invention, specific configurations that depend on the embodiments may be adopted as appropriate. Note that although data appearing in the present embodiment will be described using natural language, the data is more specifically designated by pseudo-language, commands, parameters, machine language and the like that are recognizable by a computer.

First Embodiment

Exemplary Configuration

FIG. 1 is a diagram illustrating the overall configuration of a sensing data distribution system according to a first embodiment of this invention.

This system is provided with a sensor management apparatus 1 disposed on the sensor side, a data user-side server 2 serving as a user-side apparatus, and a data intermediary server (also called a matchmaker) 3 serving as a data intermediary apparatus.

The sensor management apparatus 1 is provided with a distributor 8 and a plurality of sensor network adaptors 1a to 1k connected to this distributor 8, for example. Data transmission is possible between the data intermediary server 3, the distributor 8 and the data user-side server 2 via a communication network 4.

Sensor groups 5a to 5k each installed on a person and an object serving as a sensing target are connected to the sensor network adaptors 1a to 1k via a communication interface which is not illustrated. Note that the number of the sensors constituting the sensor groups 5a to 5k may be one or a plurality, and may be the same or different.

The plurality of sensors constituting the sensor groups 5a to 5k are, for example, consist of biosensors, environmental sensors, vibration sensors, surveillance sensors using a camera, position sensors that use GPS (Global Positioning System) and the like, and have a function of communicating with the sensor network adaptors 1a to 1k. Note that, as the communication interface between the sensor network adaptors 1a to 1k and sensors 5a to 5n, an interface using a low power wireless data communication standard such as Bluetooth (registered trademark), for example, is used.

The sensor network adaptors 1a to 1k have a function of respectively receiving sensing data transmitted from the plurality of sensors constituting the sensor groups 5a to 5k, and primary storing the received sensing data in respective buffer memories in association with identification information of transmission source. Identification information of the sensor or identification information of the measurement target (person or object) on which the sensor is mounted is used as the identification information of the transmission source. The sensor network adaptors 1a to 1k transfer the sensing data stored in the respective buffer memories to the distributor 8 autonomous or in response to a request from the distributor 8. Note that a configuration may be adopted in which sensing data transmitted from the sensors of the sensor groups 5a to 5k is transmitted directly to the distributor 8 without being stored in a buffer memory.

The distributor 8 receives the sensing data transferred from each of the sensor network adaptors 1a to 1k, and stores the received sensing data in a buffer memory. The distributor 8 has a function of delivering applicable sensing data to the data user-side server 2 serving as the destination, in accordance with a dataflow control command transmitted from the data intermediary server 3. Note that the distributor 8 may have a function of caching data control commands or the like for a fixed period, a function of detecting events from the sensor network adaptors 1a to 1k, and a function of sampling sensing data.

Figure 5:
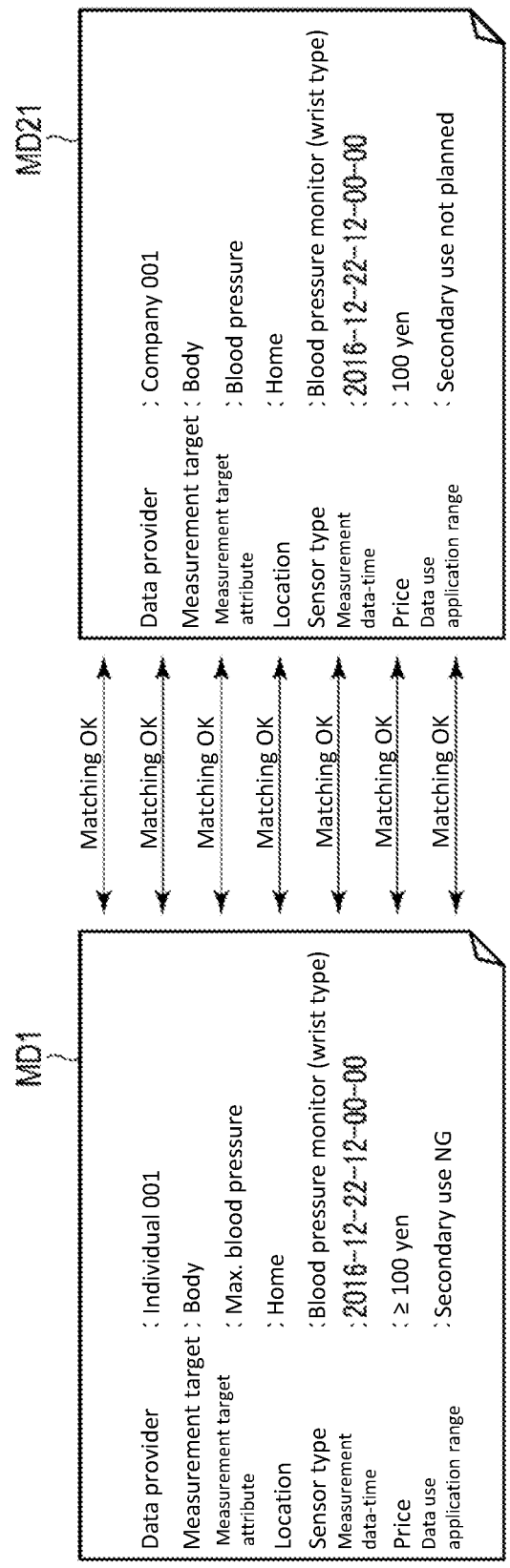
FIG. 5 is a diagram showing an example of processing for matching provider-side metadata transmitted from a sensor management apparatus and user-side metadata transmitted from a data user-side server.

Also, the sensor network adaptors 1a to 1k may have a function of respectively storing provider-side metadata relating to sensing data measured by the sensor groups 5a to 5k. The provider-side metadata includes attribute information of the sensing data to be provided. The attribute information is divided into a plurality of items, and contains information indicating the contents thereof for every item. An MD 1 of FIG. 5 is an example thereof. Note that an administrator creates the provider-side metadata in an administrator terminal which is not illustrated, but it is also possible for the sensor network adaptors 1a to 1k to automatically generate provider-side metadata on the basis of a provision condition input from the administrator in advance.

Furthermore, the sensor network adaptors 1a to 1k have a function of reading out applicable provider-side metadata in the case where a metadata transmission instruction is received from the administrator terminal, and transmitting the read-out provider-side metadata to the data intermediary server 3. Also, the sensor network adaptors 1a to 1k have a function of receiving notification information that is transmitted from the data intermediary server 3, and displaying the received notification information on the administrator terminal. Also, the sensor network adaptors 1a to 1k may have a function of adjusting the contents of the applicable provider-side metadata according to the input data, upon receiving data indicating the adjustment contents input in the administrator terminal by the administrator, and transmitting the provider-side metadata resulting from this adjustment to the data intermediary server 3.

Note that the sensor network adaptors 1a to 1k and the distributor 8 all have a hardware processor and a memory, and realize the abovementioned functions by causing a hardware processor to execute programs stored in memory.

The data user-side server 2 consists of a server computer that is operated by a third party who wants to use the sensing data that is provided by the sensor management apparatus 1. The data user-side server 2 is provided with a function of generating and transmitting metadata (hereafter called user-side metadata) relating to sensing data that the user wants to use, in response to an operation on a terminal 7 by the user, as a control function according to this invention. The user-side metadata includes an attribute of the sensing data that the user wants to use, and the configuration thereof may be the same as the provider-side metadata described earlier. An MD 21 of FIG. 5 is an example thereof.

Figure 2:
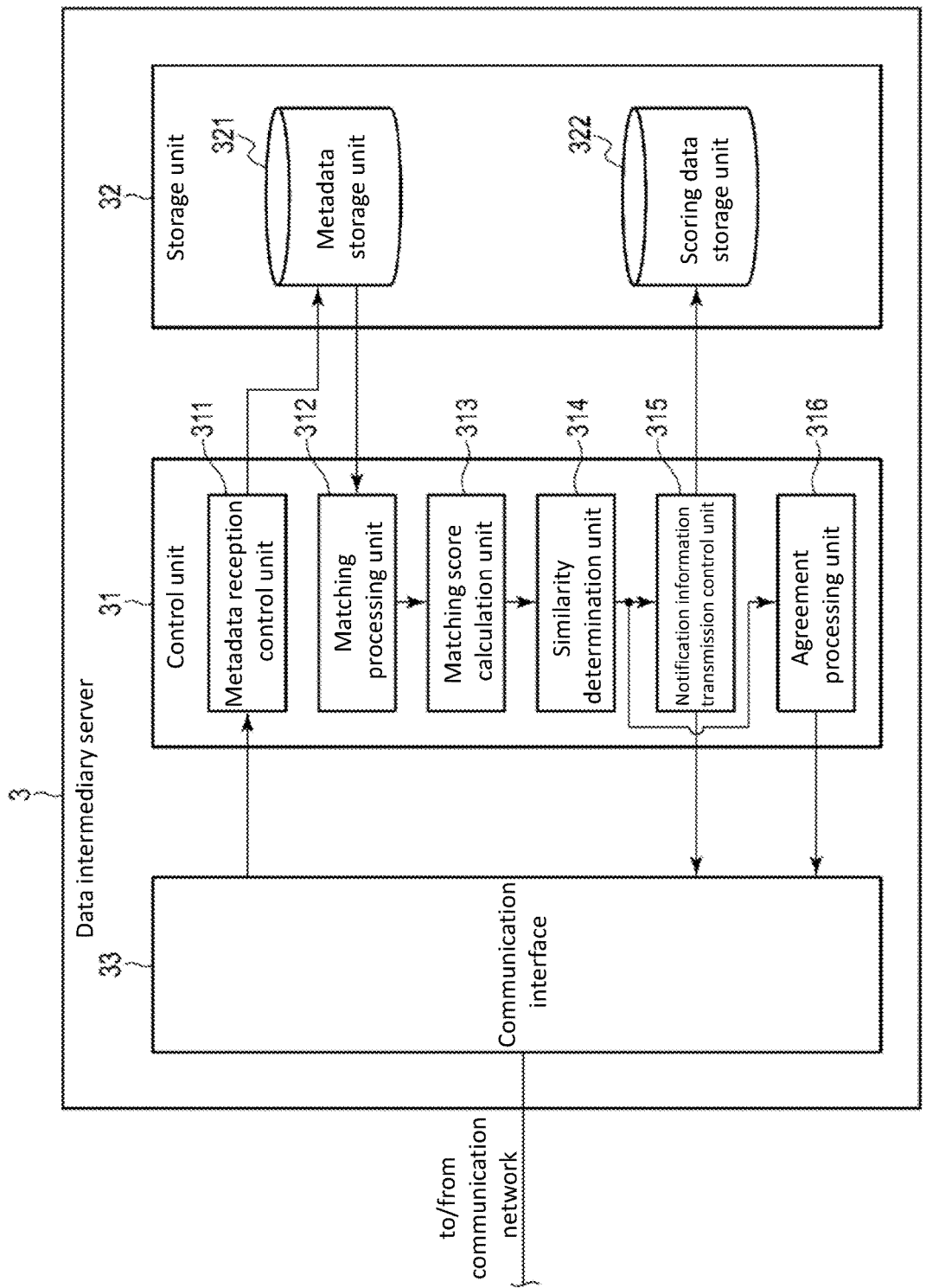
FIG. 2 is a block diagram showing the functional configuration of a data intermediary server of the system shown in FIG. 1.

The data intermediary server 3 is operated by data intermediary, and it is constituted as follows. FIG. 2 is a block diagram illustrating the functional configuration. That is, the data intermediary server 3 is provided with a control unit 31, a storage unit 32, and a communication interface 33 as hardware.

The communication interface 33 performs data transmission and reception between the distributor 8 of the sensor management apparatus 1 and the data user-side server 2 via the communication network 4.

The storage unit 32 uses an HDD (Hard Disk Drive) or an SSD (Solid State Drive) as a storage medium, and has a metadata storage unit 321 and a scoring data storage unit 322.

The metadata storage unit 321 is used in order to store provider-side metadata sent from the sensor network adaptors 1*a* to 1*k* of the sensor management apparatus 1 and user-side metadata sent from the data user-side server 2. The scoring data storage unit 322 is used in order to store a matching score calculated in the process of matching processing.

The control unit 31 is provided with a hardware processor such as a CPU (Central Processing Unit), a program memory, and a working memory, and has, as control function units according to the present embodiment, a metadata reception control unit 311, a matching processing unit 312, a matching score calculation unit 313, a similarity determination unit 314, a notification information transmission control unit 315, and a agreement processing unit 316. These control function units are all realized by causing the hardware processor to execute programs stored in the program memory.

The metadata reception control unit 311 receives provider-side metadata that is transmitted from the sensor network adaptors 1*a* to 1*k* and user-side metadata that is transmitted from the data user-side server 2 via the communication interface 33, and stores the received metadata in the metadata storage unit 321.

Whenever new provider-side metadata is stored in the metadata storage unit 321, the matching processing unit 312 compares the new provider-side metadata on an item-by-item basis with all of the user-side metadata that is stored in the metadata storage unit 321. Also, whenever new user-side metadata is stored in the metadata storage unit 321, the new user-side metadata is compared on an item-by-item basis with all of the provider-side metadata that is stored in the metadata storage unit 321. The comparison results are then notified to the matching score calculation unit 313.

The matching score calculation unit 313, for each of all combinations of the compared metadata, adds the scores of the respective items after applying weights set in advance on an item-by-item basis, based on the comparison results, and notifies the obtained total value of the scores to the similarity determination unit 314.

The similarity determination unit 314 determines the similarity of the provider-side metadata and the user-side metadata targeted for matching, by comparing the notified total values of the scores with a threshold. The similarity determination unit 314, in the case where a combination of metadata whose similarity is greater than or equal to the threshold is found, then instructs the agreement processing unit 316 to conclude an agreement. Also, combinations of metadata whose similarity is less than the threshold are notified to the notification information transmission control unit 315.

The notification information transmission control unit 315, for all of the combinations of metadata whose similarity was less than the threshold, generates notification information that includes items whose contents do not match and the scores thereof for every provider-side metadata, and transmits the notification information to the sensor network adaptors 1*a* to 1*k* from the communication interface 33.

Note that a configuration may be adopted in which the notification information transmission control unit 315 has a function of generating, for items whose contents do not match, data needs information requesting adjustment (e.g., relaxation of conditions) of the contents thereof, and transmitting the generated data needs information to the sensor network adaptors 1*a* to 1*k* from the communication interface 33 as the notification information.

The agreement processing unit 316 notifies the distributor 8 that an agreement has been concluded, in order to cause sensing data whose similarity between metadata is greater than or equal to the threshold to be delivered to the data user-side server 2 of the sensor management apparatus 1 from the distributor 8. A dataflow control command is then transmitted to the distributor 8.

Exemplary Operations

Next, exemplary operations of a system constituted as described above will be described.

Figure 3:
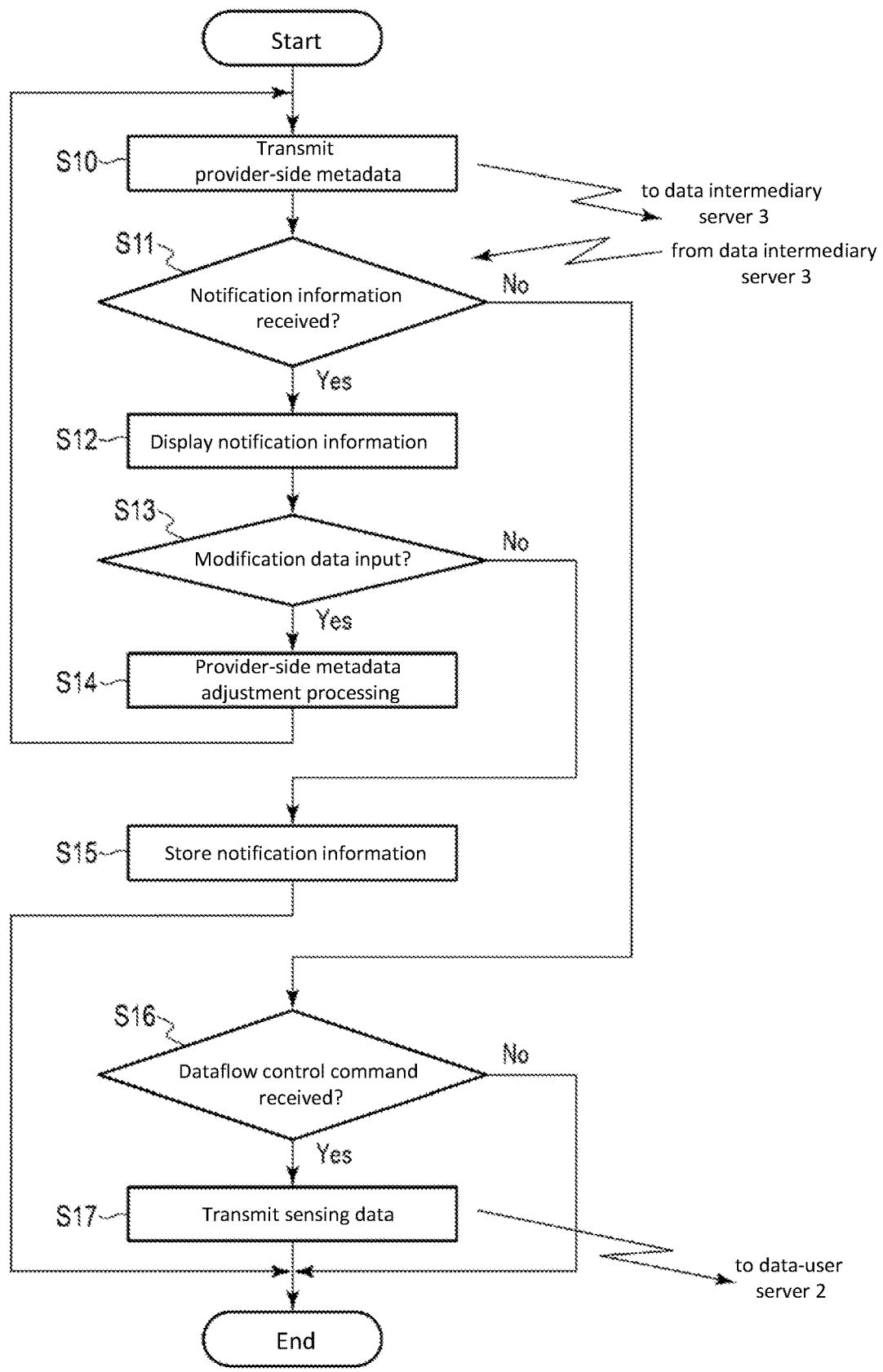
FIG. 3 is a flowchart showing an example of the processing procedure and processing contents of a sensor network adaptor and a distributor of the system shown in FIG. 1.
Figure 4:
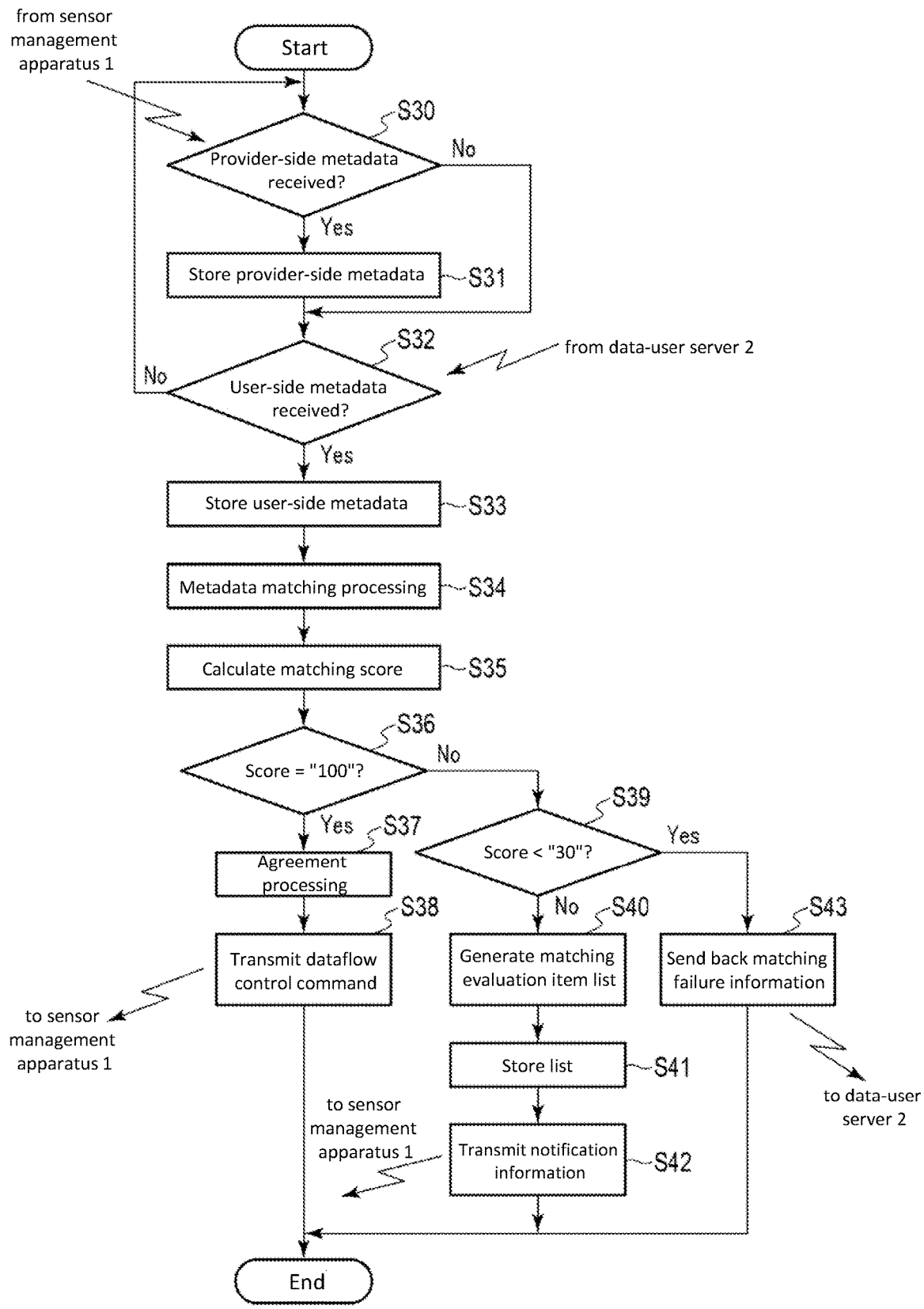
FIG. 4 is a flowchart showing an example of the processing procedure and processing contents of a data intermediary server shown in FIG. 2.

FIG. 3 is a flowchart showing an example of the processing procedure and processing contents of the sensor network adaptors 1*a* to 1*k* and the distributor 8, and FIG. 4 is a flowchart showing the processing procedure and processing contents of the data intermediary server 3.

(1) Collection of Sensing Data and Transmission of Provider-Side Metadata

The sensor network adaptors 1*a* to 1*k*, under the control of the sensing data management control unit 116, receive sensing data that is transmitted at a fixed cycle from each sensor constituting the respective sensor groups 5*a* to 5*k* via respective sensor interfaces, and each sequentially store the received sensing data in a buffer memory. As the sensing data, the blood-pressure data of a person is given, for example, but is not limited thereto.

The administrator displays a template for metadata creation, for example, on the administrator terminal. The template, as shown in the MD 1 of FIG. 5, for example, includes a plurality of items indicating attributes of the sensing data, such as "data provider", "measurement target", "measurement target attribute", "location", "sensor type", "measurement date-time", "price", and "data use application range", for example. The administrator inputs respective provision conditions for "price" and "data use application range" which are items that can be set arbitrarily out of the above items. Thus, provider-side metadata as shown in the MD 1 of FIG. 5 is created. This created provider-side metadata is stored in provider-side metadata storage units of the sensor network adaptors 1*a* to 1*k*.

Note that a configuration may be adopted in which the sensor network adaptors 1*a* to 1*k* automatically generate provider-side metadata, for each individual serving as a data provider, by inputting conditions in advance and storing the input conditions in a data storage unit.

After the provider-side metadata is created, the administrator inputs a transmission instruction for provider-side metadata MD 1 in the administrator terminal. The sensor network adaptors 1a to 1k, under the control of a provider-side metadata transmission control unit, then read out the applicable provider-side metadata MD 1 from the provider-side metadata storage unit in step S10, and transmit the read provider-side metadata MD 1 to the data intermediary server 3 via the communication interface.

(2) Transmission of User-Side Metadata

In the data user-side server 2, the user, in the terminal 7, inputs an attribute of the sensing data that the user wants to use on an item-by-item basis, on the basis of a template similarly to the creation of provider-side metadata, and creates user-side metadata. The MD 21 of FIG. 5 is an example thereof. This created user-side metadata MD 21 is stored in a metadata storage unit of the data user-side server 2. When the user inputs transmission instruction for the user-side metadata MD 21 from the terminal 7 in this state, the user-side metadata MD 21 is transmitted to the data intermediary server 3 from the data user-side server 2.

(3) Operation of Data Intermediary Server 3

(3-1) Reception of Metadata

The data intermediary server 3, under the control of the metadata reception control unit 311, respectively monitors reception of provider-side metadata and user-side metadata in step S30 and step S32.

When provider-side metadata MD 1 is transmitted from the sensor network adaptors 1a to 1k in this state, the metadata reception control unit 311, in step S31, receives the provider-side metadata via the communication interface 33, and stores the received provider-side metadata in the metadata storage unit 321. Also, when user-side metadata is transmitted from the data user-side server 2, the metadata reception control unit 311, in step S33, receives the user-side metadata via the communication interface 33, and stores the received user-side metadata in the metadata storage unit 321.

Similarly thereafter, the data intermediary server 3, whenever provider-side metadata MD 1 is transmitted from the sensor network adaptors 1a to 1k and whenever user-side metadata is transmitted from the data user-side server 2, receives the provider-side metadata and the both-side metadata and stores the received metadata in the metadata storage unit 321.

(3-2) Matching of Metadata and Calculation of Score Thereof

When new provider-side metadata or user-side metadata is received, the data intermediary server 3 performs processing for matching metadata as follows in step S34, under the control of the matching processing unit 312.

That is, in the case where provider-side metadata is newly received, the received provider-side metadata is compared on an item-by-item basis with all of the user-side metadata that is stored in the metadata storage unit 321. Also, in the case where user-side metadata is newly received, the received user-side metadata is compared on an item-by-item basis with all of the provider-side metadata that is stored in the metadata storage unit 321. Binary operation of the data is performed on an item-by-item basis, and the degree of matching is calculated. An example in which the provider-side metadata MD 1 and the user-side metadata MD 21 match on an item-by-item basis is shown in FIG. 5.

Note that a configuration may be adopted in which processing for matching designated specific provider-side metadata and the user-side metadata is performed, in response to a trigger signal from the sensor side or the user side, and the instruction contents of the trigger signal are not limited to the above processing example.

The data intermediary server 3, under the control of the matching score calculation unit 313 next, calculates scores on an item-by-item basis such as described above, according to the degree of matching for every item that is calculated, in step S35.

That is, the respective item scores are weighted according to importance for every item. For example, as shown in FIG. 7, "10" points are allocated to each of "data provider", "measurement target", "location", "sensor type" and "measurement date-time", and a higher value of "20" points are allocated to "measurement target attribute", "price" and the "data use application range".

The matching score calculation unit 313 then, for each item, sets the score of the item to 100 percent if the data is perfectly matched, sets the score of the item to 50 percent if the data is closely matched, and sets the score of the item to zero if the data does not match. For example, in the example of the provider-side metadata MD 1 and user-side metadata MD 21 shown in FIG. 5, since "measurement target attribute" is closely matched, "10" points are given as the score to the "measurement target attribute", and since the other items are all perfectly matched, 100 percent is given to each of these items.

Finally, the matching score calculation unit 313 totals the scores given to each of the items, and outputs the result thereof as a similarity. For example, in the example of the provider-side metadata MD 1 and the user-side metadata MD 21 shown in FIG. 5, the similarity will be shown in FIG. 6. FIG. 6 illustrates the case where the weights for the measurement target attribute, price and data use application range are set to twice that of the other items as a score calculation example, and the similarity in this case is 100 points out of 110 points.

(3-3) Determination of Similarity Between Metadata

When the similarity between the metadata is calculated by the score calculation processing, the data intermediary server 3, under the control of the similarity determination unit 314, then first determines whether the similarity (total value of scores) is greater than or equal to "100", for example, in step S36. If the similarity is greater than or equal to "100", the processing then transitions to step S37.

On the other hand, it is assumed that, in the user-side metadata, "price" is 80 yen or less and "data use application range" is secondary use planned as shown in MD 22 of FIG. 7. In this case, since both "price" and "data use application range" are unmatched, the scores thereof will be 0%, and the similarity will be "60" points. Thus, in step S36, the similarity is determined to be less than "100" points.

Next, the similarity determination unit 314 determines whether the similarity is less than "30", for example, in step S39. If the determination result indicates that the similarity is less than "30", the processing transitions to step S43, and matching failure information is notified to the data user-side server 2.

(3-4) Sending of Notification Information

It is assumed that the determination results of step S36 and step S39 indicate that the similarity is less than "100" and greater than or equal to "30". In this case, the data intermediary server 3, under the control of the notification information transmission control unit 315, first generates a matching evaluation item list in step S40. In the matching evaluation item list, as shown in MR1 and MR2 of FIG. 9, for example, the total value of the scores (similarity)

together with the request contents (requested conditions) of the user-side metadata for unmatched items are appended to the provider-side metadata.

Figure 9:
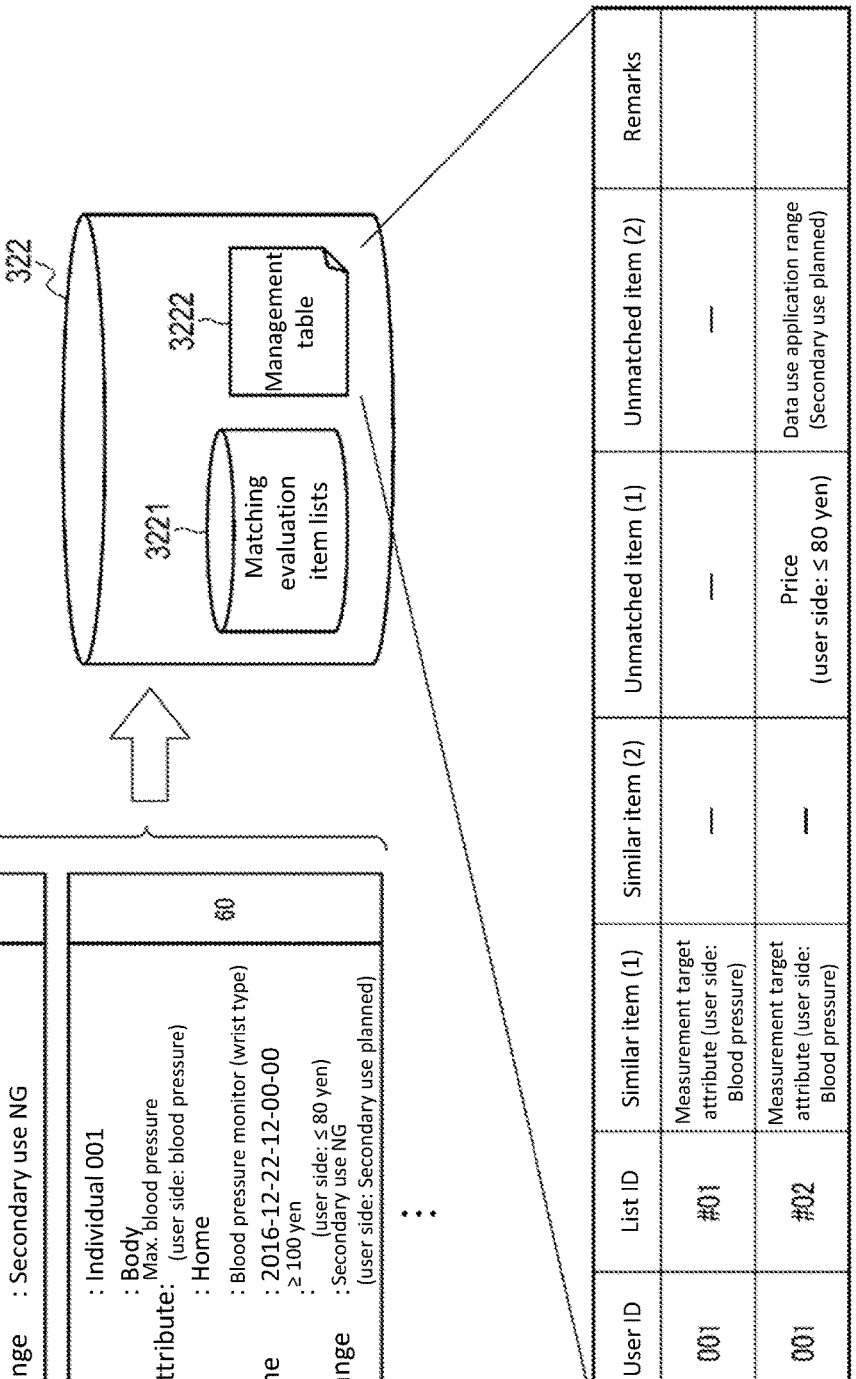
FIG. 9 is a diagram showing an example of matching evaluation item lists and a management table that are stored in a scoring data storage unit.

The notification information transmission control unit 315 next, in step S41, stores the matching evaluation item lists MR1 and MR2 in association with a list number (list No.) in a matching evaluation item list storage area 3221 of the scoring data storage unit 322. Also, at this time, management information of the matching evaluation item lists MR1 and MR2 is stored in a management table 3222 of the scoring data storage unit 322. In the management information of the matching evaluation item lists MR1 and MR2, as shown in FIG. 9, for example, information indicating the contents of similar items and unmatched items is stored in association with user IDs and list IDs, and this information is used in order to perform mediation of the provision conditions and use conditions between the provider-side and user-side of sensing data.

The notification information transmission control unit 315, next in step S42, transmits the matching evaluation item lists MR1 and MR2, as notification information, to the sensor network adaptors 1a to 1k from the communication interface 33. Note that, in the above example, past matching evaluation item list MR1 when the matching score was "100" or more is collectively transmitted for reference, in addition to the matching evaluation item list MR2 whose matching score was less than "100". However, the matching evaluation item list MR1 for reference does not necessarily need to be transmitted.

(4) Adjustment of the Provider-Side Metadata by Sensor Network Adaptors 1a to 1k The sensor network adaptors 1a to 1k, as shown in FIG. 3, monitor reception of notification information by a notification information reception control unit in step S11, and monitor reception of dataflow control commands by a dataflow control command reception control unit in step S16.

When notification information is received from the data intermediary server 3 in this state, the sensor network adaptors 1a to 1k, under the control of a metadata adjustment unit, display the received notification information on the administrator terminal (not shown) in step S12. Specifically, the matching evaluation item lists MR1 and MR2 included in the received notification information are displayed as information representing the matching result on the administrator terminal via an input/output interface. FIG. 8 shows an example of the display result thereof.

The administrator, with regard to the request contents of the user-side metadata contained in the displayed matching evaluation item list MR2, judges, on an item-by-item basis, whether adjustment of metadata provided thereby is possible, and if adjustment is possible, manually inputs modification data on the administrator terminal. The metadata adjustment unit transitions to step S14 upon accepting input of the modification data in step S13, and reflects the input modification data in the corresponding item of the provider-side metadata. That is, the provider-side metadata is modified by a manual input operation of the administrator on the sensor data provider side.

Note that, by storing information indicating in advance the range that can be adjusted for every item in a data storage unit, a configuration may be adopted in which the sensor network adaptors 1a to 1k automatically adjust the provider-side metadata, based on the data contents of notification information and information on the adjustable range.

The provider-side metadata whose item contents was modified in step S14 is transmitted to the data intermediary server 3 in step S10. Note that it is assumed that the operation modifying the provider-side metadata was not detected in step S14. In this case, the metadata adjustment unit, in step S15, stores the notification information received in step S11 in the notification information storage unit. The administrator is thereby able to refer to the provider-side metadata when creating this metadata.

(5) Transmission of Sensing Data

The data intermediary server 3, when the similarity is determined in the above step S36 to be "100" or more, for example, transitions to step S37 and executes agreement processing. In the agreement processing, an agreement procedure for enabling provision/use of sensing data relating to an individual or object that is to be provided is executed between the sensor network adaptors 1a to 1k and the distributor 8 that are on provider side of sensing data and the data user-side server 2 that is on the user side of sensing data.

On conclusion of the agreement, the data intermediary server 3, in step S38, transmits a dataflow control command to the distributor 8. In contrast, the distributor 8, when it is detected in step S15 that the dataflow control command has been received, reads out the sensing data corresponding to the provider-side metadata designated by the dataflow control command from a buffer memory, in step S17. This sensing data is then transmitted from the communication interface to the data user-side server 2 serving as a provision destination.

Thereafter, whenever new sensing data relating to an applicable person or object is transferred from the sensor network adaptors 1a to 1k and stored in the buffer memory, the sensing data is transmitted to the data user-side server 2 serving as the provision destination. Note that transmission of this sensing data is continuously executed until the agreement is cancelled.

Effect of the First Embodiment

In the first embodiment as described in detail above, provider-side metadata transmitted from the sensor network adaptors 1a to 1k and user-side metadata transmitted from the data user-side server 2 undergo matching on an item-by-item basis in the data intermediary server 3, and scores are calculated according to the degree of matching. A configuration may be adopted in which, in the case where the total value of the scores (similarity) does not meet a predetermined first threshold but is greater than or equal to a second threshold, a matching evaluation item list to which the total value of the scores and information on unmatched items of the user-side metadata are appended is generated, and this matching evaluation item list is notified to the sensor network adaptors 1a to 1k as notification information.

Accordingly, in the sensor network adaptors 1a to 1k, it becomes possible for the administrator to adjust the contents of provider-side metadata on an item-by-item basis according to the notification information and retransmit the adjusted provider-side metadata. Thus, the contents of the provider-side metadata can be approximated to the contents of the user-side metadata, thereby enabling distribution of sensing data to be promoted.

Also, a configuration may be adopted in which, when calculating scores, the scores are weighted according to importance for every item. Thus, the importance for every item can be reflected when evaluating the similarity between metadata, enabling more precise evaluation to be performed.

Furthermore, a configuration may be adopted in which the sensor network adaptors 1a to 1k display a matching evaluation item list that is included in a notification request transmitted from the data intermediary server 3 on the administrator terminal of the administrator as information representing the matching result. In the matching evaluation item list, information representing the use conditions on the user side is appended in association with unmatched items. Thus, the administrator is able to perform precise adjustment of the provider-side metadata including whether to permit adjustment of the provider-side metadata, by viewing the matching result.

Second Embodiment

In the first embodiment, a configuration was adopted in which the data intermediary server 3, in the case where the total value of the scores (similarity) is less than "30", sends back matching failure information to the data user-side server 2 in step S43. Although the user side can thus be informed that matching ended unfavorably, the reason for this is not conveyed.

In view of this, in the second embodiment of this invention, the data intermediary server 3 transmits data including item-by-item evaluation results to the data user-side server 2 in addition to matching failure information. For example, the data intermediary server 3 reads out the corresponding matching evaluation item list from the scoring data storage unit 322, and transmits this list to the data user-side server 2.

As a result, in the data user-side server 2, the administrator can be informed of the evaluation results on an item-by-item basis, and will thereby be able to adjust the use conditions regarding sensing data that the user wants to use on an item-by-item basis.

Other Embodiments

A configuration may be adopted in which the degree of matching is displayed on an item-by-item basis in the matching evaluation item list. For example, the data of the applicable item is displayed in "black" in the case of a perfect match, in "blue" in the case of a close match, and in "red" in the case of no match. As a result, the administrator of the sensor management apparatus 1 is able to quickly recognize items to be adjusted. Also, apart from differentiating the display colors, a configuration may be adopted in which the font is set to bold or italics or the size of the font is changed.

In addition, this invention can be carried out by being variously modified to an extent that does not depart from the spirit of the invention, with regard to the type of sensing data, the method of calculating the matching score, the configuration of the matching evaluation item list, the configuration of the sensor management apparatus 1 and the data intermediary server, the processing procedures and processing content thereof, and the like.

In short, this invention is not limited to a strict interpretation of the foregoing embodiments, and can be embodied by modifying the constituent elements to an extent that does not depart from the spirit thereof. Also, various inventions can be formed through appropriate combinations of the plurality of constituent elements disclosed in the foregoing embodiments. For example, some of the constituent elements shown in the embodiments may be omitted. Furthermore, constituent elements may be appropriately combined across different embodiments.

The above embodiments can be partially or wholly described as in the following supplementary notes, but the present invention is not limited thereto.

Supplementary Note 1

A data intermediary apparatus configured to perform communication, via a network, between a sensor management apparatus that manages sensing data output from a sensor and a user-side apparatus that is used by a user of sensing data, and having a hardware processor and a memory, the hardware processor being configured to:

acquire, from the sensor management apparatus, first metadata including attribute information of sensing data that is to be provided;

acquire, from the user-side apparatus, second metadata including attribute information of sensing data that is desired for use;

calculate a similarity between the acquired first metadata and the acquired second metadata by performing matching of the first and second metadata, and evaluate the similarity; and transmit adjustment notification information for requesting adjustment of the first metadata to the sensor management apparatus, in a case where a result of evaluating the similarity does not meet a predetermined condition, and the memory having a storage unit configured to store the acquire first and second metadata.

Supplementary Note 2

A sensor data intermediary method that is executed by a data intermediary apparatus configured to perform communication, via a network, between a sensor management apparatus that manages sensing data output from a sensor and a user-side apparatus that is used by a user of sensing data, the data intermediary method being provided with:

a first acquisition process of using at least one hardware processor to acquire, from the sensor management apparatus, first metadata including attribute information of sensing data that is to be provided;

a second acquisition process of using the at least one hardware processor to acquire, from the user-side apparatus, second metadata including attribute information of sensing data that is desired for use;

an evaluation process of using the at least one hardware processor to calculate a similarity between the acquired first metadata and the acquired second metadata by performing matching of the first and second metadata, and evaluate the similarity; and a transmission process of using the at least one hardware processor to transmit notification information including the similarity, in a case where an evaluation result obtained in the evaluation process does not meet a predetermined condition.

The invention claimed is:

1. A sensing data distribution system comprising:
    a sensor management apparatus configured to manage sensing data output from a sensor;
    a user-side apparatus configured to be used by a user of the sensing data; and
    a data intermediary apparatus configured to perform communication between the sensor management apparatus and the user-side apparatus via a network,
    wherein the data intermediary apparatus includes:
    a first acquisition unit configured to acquire, from the sensor management apparatus, first metadata including attribute information of sensing data that is to be provided;
    a second acquisition unit configured to acquire, from the user-side apparatus, second metadata including attribute information of sensing data that is desired for use;
    a similarity evaluation unit configured to calculate a similarity between the first metadata acquired by the first acquisition unit and the second metadata acquired by the second acquisition unit by performing matching of the first and second metadata, and evaluate the similarity; and a notification information transmission unit configured to transmit instruction information to the sensor management apparatus for causing the sensor management apparatus to transfer the sensing data to the user-side apparatus, in a case where the similarity is larger than or equal to a threshold, and transmit notification information including the similarity to the sensor management apparatus, in a case where the similarity is smaller than the threshold, and the sensor management apparatus includes:

a notification information reception unit configured to receive the notification information transmitted from the data intermediary apparatus.

2. A data intermediary apparatus configured to perform communication, via a network, between a sensor management apparatus configured to manage sensing data output from a sensor and a user-side apparatus configured to be used by a user of sensing data, comprising:

a first acquisition unit configured to acquire, from the sensor management apparatus, first metadata including attribute information of sensing data that is to be provided;

a second acquisition unit configured to acquire, from the user-side apparatus, second metadata including attribute information of sensing data that is desired for use;

a similarity evaluation unit configured to calculate a similarity between the first metadata acquired by the first acquisition unit and the second metadata acquired by the second acquisition unit by performing matching of the first and second metadata, and evaluate the similarity; and a first notification information transmission unit configured to transmit instruction information to the sensor management apparatus for causing the sensor management apparatus to transfer the sensing data to the user-side apparatus, in a case where the similarity is larger than or equal to a threshold, and transmit first notification information including the similarity to the sensor management apparatus, in a case where the similarity is smaller than the threshold.

3. The data intermediary apparatus according to claim 2, wherein the similarity evaluation unit includes:

a score calculation unit configured to, in a case where the first and second metadata each have the same plurality of items, calculate scores representing a degree of similarity between the metadata on an item-by-item basis, and take a total value of the scores as the similarity.

4. The data intermediary apparatus according to claim 3, wherein the score calculation unit is configured to set weight coefficients of the scores in advance on an item-by-item basis, and calculate the scores representing the degree of similarity between the metadata on an item-by-item basis, with consideration for the weight coefficients.

5. The data intermediary apparatus according to claim 3, wherein the first notification information transmission unit includes:

an extraction unit configured to extract an unmatched item on a basis of the scores calculated on an item-by-item basis;

a generation unit configured to generate item-by-item notification information including the extracted unmatched item and the score calculated for the extracted unmatched item; and a transmission unit configured to transmit the generated item-by-item notification information to the sensor management apparatus as the first notification information.

6. The data intermediary apparatus according to claim 2, further comprising:

a second notification information transmission unit configured to, in a case where the evaluation result of the similarity evaluation unit does not meet the predetermined condition, transmit second notification information representing the evaluation result to the user-side apparatus.

7. A sensor data intermediary method for executed by a data intermediary apparatus configured to perform communication, via a network, between a sensor management apparatus configured to manage sensing data output from a sensor and a user-side apparatus configured to be used by a user of sensing data, the method comprising:

a process of the data intermediary apparatus acquiring, from the sensor management apparatus, first metadata including attribute information of sensing data that is to be provided;

a process of the data intermediary apparatus acquiring, from the user-side apparatus, second metadata including attribute information of sensing data that is desired for use;

a process of the data intermediary apparatus calculating a similarity between the acquired first metadata and the acquired second metadata by performing matching of the first and second metadata, and evaluating the similarity; and a process of the data intermediary apparatus transmitting instruction information to the sensor management apparatus for causing the sensor management apparatus to transfer the sensing data to the user-side apparatus, in a case where the similarity is larger than or equal to a threshold, and transmitting notification information including the similarity to the sensor management apparatus, in a case where the similarity is smaller than the threshold.

8. A non-transitory computer readable medium storing a program configured to cause a computer to function as each unit included in the data intermediary apparatus according to claim 2.

9. The data intermediary apparatus according to claim 4, wherein the first notification information transmission unit includes:

an extraction unit configured to extract an unmatched item on a basis of the scores calculated on an item-by-item basis;

a generation unit configured to generate item-by-item notification information including the extracted unmatched item and the score calculated for the extracted unmatched item; and a transmission unit configured to transmit the generated item-by-item notification information to the sensor management apparatus as the first notification information.

10. A non-transitory computer readable medium storing a program configured to cause a computer to function as each unit included in the data intermediary apparatus according to claim 1.

11. A non-transitory computer readable medium storing a program configured to cause a computer to function as each unit included in the data intermediary apparatus according to claim 1.

12. A non-transitory computer readable medium storing a program configured to cause a computer to function as each unit included in the data intermediary apparatus according to claim 4.

13. A non-transitory computer readable medium storing a program configured to cause a computer to function as each unit included in the data intermediary apparatus according to claim 5.

14. A non-transitory computer readable medium storing a program configured to cause a computer to function as each unit included in the data intermediary apparatus according to claim 6.

* * * * *